B. V. NORDBERG.
SUPPORT FOR ROCKER SHAFTS AND THE LIKE.
APPLICATION FILED JUNE 1, 1920.
1,397,598.
Patented Nov. 22, 1921.
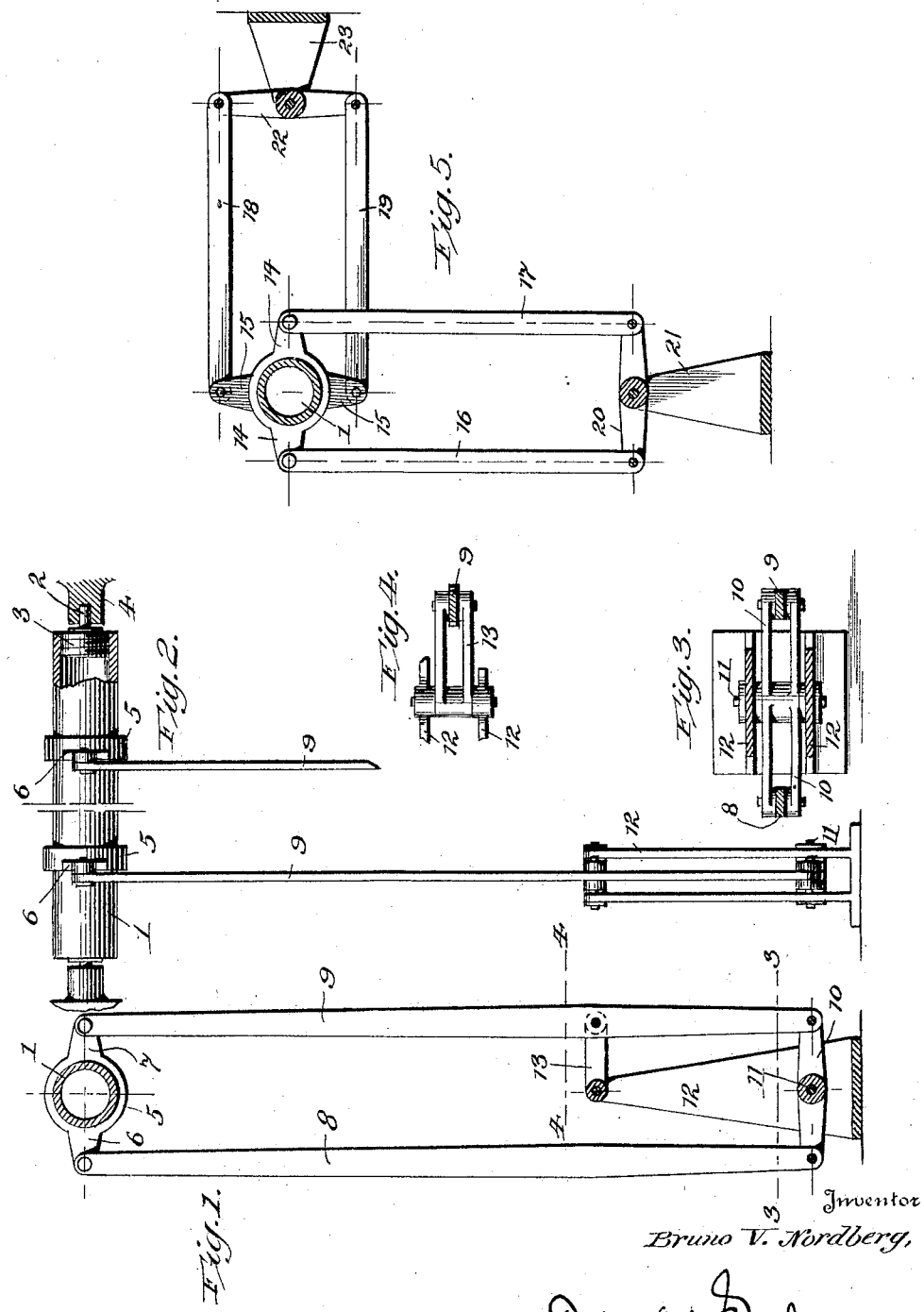
Inventor
Bruno V. Nordberg,
By Dodge and Sons
Attorneys

BRUNO V. NORDBERG, OF MILWAUKEE, WISCONSIN.

SUPPORT FOR ROCKER-SHAFTS AND THE LIKE.

1,397,598.  Specification of Letters Patent.  Patented Nov. 22, 1921.

Application filed June 1, 1920. Serial No. 385,496.

*To all whom it may concern:*

Be it known that I, BRUNO V. NORDBERG, a citizen of the United States, residing at Milwaukee, in the county of Milwaukee and State of Wisconsin, have invented certain new and useful Improvements in Supports for Rocker-Shafts and the like, of which the following is a specification.

This invention pertains to an improved means for supporting engine rock shafts.

In connection with engine governors, throttle valve operating mechanism, and similar devices, shafts of considerable length are often required. Such shafts under ordinary conditions have to transmit a relatively small torque, but, notwithstanding such fact they have to be made relatively large in order to reduce to a minimum their tendency to deflect or twist. It is generally required that the friction of the bearings for such shaft be reduced to an absolute minimum; and this is particularly the case with rock shafts of a governing mechanism. The shaft as is well understood is used to transmit the motion of the governor to the cut-off gear, throttle valve, or any other means of controlling the flow of the medium in which is stored the energy that operates the engine. The governor may be located near the center of such rock shaft or at one end of the same.

Ordinary bearings for supporting shafts of large diameter are objectionable as such bearings produce friction in direct proportion to the diameter of the bearing. Often it is convenient to support a bearing in the ordinary way by pedestals and the like, the shafts of necessity being located some distance from any place affording a firm support.

The main object of the present invention is to provide such a support for a rock shaft that its bearings will produce a minimum of friction and to maintain the rigidity of the shaft against twisting or torsional strains when the shaft is moved about its axis.

Two embodiments are illustrated in the annexed drawings wherein:

Figure 1 is a sectional elevation of one embodiment of my invention.

Fig. 2 is a side elevation thereof, a portion only of the shaft being shown and broken away in part to illustrate one of the end bearings for the shaft.

Fig. 3 a transverse section on the line 3—3 of Fig. 1.

Fig. 4 a similar view on the line 4—4, and

Fig. 5 a sectional elevation showing a further embodiment or arrangement of the structure.

Referring first to Figs. 1 to 4 inclusive, 1 denotes the rocker shaft which is moved by suitable connections (not shown) say for instance by a governor, and which in turn transmits such motion to a suitable valve gear, throttle or cut-off device (not shown) as is well understood.

The shaft at each end is provided with a suitable bearing, one which is preferably small and consequently presents little frictional bearing surface. In Fig. 2 the bearing takes the form of a small pintle 2 extending outwardly from a block 3 secured in the end of the shaft (there being of course one at each end of the shaft) the pintle finding its bearing in a fixed support 4.

Rigidly affixed to shaft 1 is a sleeve or collar 5 formed with laterally projecting arms 6 and 7, said sleeve and arms forming in effect a two arm lever, the fulcrum of which is coincident with the axis of shaft 1.

A link 8 is pivotally connected to arm 6 and a similar link 9 is likewise connected to arm 7.

Said links at their lower ends are respectively pivoted to the outer ends of a rocker lever 10 fulcrumed upon a shaft 11 mounted in a fixed standard 12, the arms of said lever being equal in length to the arms 6 and 7 when measured from their points of fulcrum to their points of attachment to the links 8 and 9.

A radius bar 13 is pivoted to the upper end of the standard 12 said link lying parallel to the upper and lower double arm levers and being pivotally connected to one of the links 8 or 9 in the instant case to 9. Said bar is equal in length to the corresponding arm of lever 10 and consequently equal to that of arm 7.

Two or more of such shaft supporting devices will be connected to shaft 1 depending upon the length of the shaft and other factors.

The pivotal connections between the parts are made small so as to reduce the friction to a minimum.

The two double arm levers and the interposed links 8 and 9 produce a parallelogram, the corresponding parallel elements of which are maintained in such relation by the interposed radius bar 13 one end of which swings about a fixed fulcrum. This results in maintaining the axis of shaft 1 in a rigidly fixed position even when said shaft is oscillated through the angle permissible by the position of the levers and links.

The arrangement so far described is used where a rigid support can be had only in one direction from the shaft and while shown as vertically arranged it could as well be horizontal.

If rigid supports for the suspension device of the shaft may be had in two directions an arrangement such as shown in Fig. 5 will be employed.

In this instance the shaft 1 is provided with double arm levers 14 and 15 to each of which is pivotally connected a pair of links or bars 16, 17 and 18, 19, respectively, the links of each pair being in parallelism.

Links 16 and 17 are pivotally connected at their opposite ends to the ends of a lever 20 fulcrumed at its mid-length upon a fixed support 21, while links 18 and 19 are likewise connected to a lever 22 fulcrumed at its mid-length to a fixed support 23. Each pair of links and their connected levers form parallelograms which by reason of their standing at an angle to each other serve to maintain the axis of the shaft in a fixed position. One of said parallelograms becomes in effect the equivalent of the radius bar 13 of the first described construction as they both have the same effect in the end, namely, preventing a lateral displacement of the sustaining parallelogram arrangement of links and levers with a consequent shifting of the shaft's axis out of its fixed position.

While the fixed supports 21 and 23 are shown as standing at right angles it is manifest that this is not absolutely necessary to the proper working of the structure.

Having thus described my invention what I claim is:

1. In combination with a shaft supported at its ends for oscillation about its axis, of rocking means, independent of such end supports, located intermediate the ends of the shaft and extending outwardly in opposite directions from the shaft for sustaining the shaft against flexure or twisting when the shaft is actuated.

2. In combination with a shaft supported at its ends for oscillation about its axis, means connected to the shaft intermediate such end supports for sustaining the shaft against twisting or flexure, said means comprising a pair of links and a pair of levers pivotally connected to each other in the form of a parallelogram, one of said levers having its fulcrum point coincident with the axis of the shaft.

3. In combination with a shaft supported at its ends for oscillation about its axis; a fixed element located to one side of the shaft and spaced therefrom; a lever fulcrumed at its center to said element; a lever fixed to the shaft and having its fulcrum point coincident with the axis of the shaft, said levers being of equal length and arranged parallel to each other; and a pair of links pivotally connected to the levers.

4. In combination with a shaft supported at its ends for oscillation about its axis; a fixed element located to one side of the shaft and spaced therefrom; a lever fulcrumed at its center to said element; a second lever of equal length fixed to the shaft its fulcrum point being coincident with the axis of the shaft, said levers lying in parallelism; links pivotally connected to the corresponding ends of the opposite levers; and a radius bar pivoted to the fixed element at one end and at its opposite end to one of the links.

5. In combination with a shaft supported at its ends for oscillation about its axis; a fixed element located to one side of the shaft and spaced therefrom; means for preventing deflection of the shaft, said means comprising a pair of spaced levers, one fulcrumed upon the supporting element and the other fixed to the shaft and movable therewith, and a pair of links pivotally connected to the opposed ends of the levers, the links and levers forming in effect a parallelogram; and means for maintaining the elements in parallelogram relation when moved upon oscillation of the shaft.

6. In combination with a shaft; a pintle like support for each end of the shaft; and a plurality of parallelogram like supporting members for the shaft, each member comprising a lever secured to the shaft, the fulcrum whereof is coincident with the axis of the shaft, a second lever fulcrumed at its center upon a fixed element located to one side of the shaft, and a pair of parallel links pivotally connected to the opposite ends of the levers in pairs.

In testimony whereof I have signed my name to this specification.

BRUNO V. NORDBERG.